US008925570B2

(12) United States Patent
Marvin et al.

(10) Patent No.: US 8,925,570 B2
(45) Date of Patent: Jan. 6, 2015

(54) ARRANGEMENT FOR CLEANING HYDRAULIC COUPLER MATING SURFACES

(71) Applicant: Deere & Company, Moline, IL (US)

(72) Inventors: Paul D Marvin, Dewitt, IA (US); Nathaniel V Silver, Geneseo, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/750,600

(22) Filed: Jan. 25, 2013

(65) Prior Publication Data

US 2014/0209186 A1    Jul. 31, 2014

(51) Int. Cl.
F16L 55/00 (2006.01)
F16L 37/30 (2006.01)
B62D 49/00 (2006.01)

(52) U.S. Cl.
CPC ............... F16L 55/00 (2013.01); B62D 49/00 (2013.01); *F16L 2201/40* (2013.01)
USPC .... 137/238; 137/614; 137/614.04; 251/149.1

(58) Field of Classification Search
USPC .................. 137/238, 240, 246, 614, 137/614.03–614.05; 251/149.1, 149.6
See application file for complete search history.

(56) References Cited

U.S. PATENT DOCUMENTS

| 5,088,529 | A  | * | 2/1992 | Jones et al. .................... 141/59 |
| 5,649,563 | A  | * | 7/1997 | Shimano ..................... 137/240 |
| 5,823,221 | A  | * | 10/1998 | Stomp et al. ................. 137/238 |
| 6,125,871 | A  | * | 10/2000 | Drab et al. .................... 137/240 |
| 7,360,976 | B2 | * | 4/2008 | Bryan .......................... 137/238 |
| 7,565,917 | B2 | * | 7/2009 | Kamiya et al. ............ 137/614.04 |
| 8,544,500 | B2 | * | 10/2013 | Itafuji et al. ................. 137/240 |

FOREIGN PATENT DOCUMENTS

EP    1950484 A1    7/2008

OTHER PUBLICATIONS

German Office Action issued in counterpart application No. 102013225134.3, dated Feb. 18, 2014 (8 pages).

* cited by examiner

*Primary Examiner* — Kevin Lee

(57) ABSTRACT

A hydraulic coupler (100) includes a first coupling (102) and the second coupling (106) and further includes a fluid cavity (144) defined in a second support (108) for the second coupling (106) configured to eject fluid and clean at least one of the first coupling (102) and the second coupling (106) as the first coupling (102) and the second coupling (106) are mutually engaged.

19 Claims, 3 Drawing Sheets

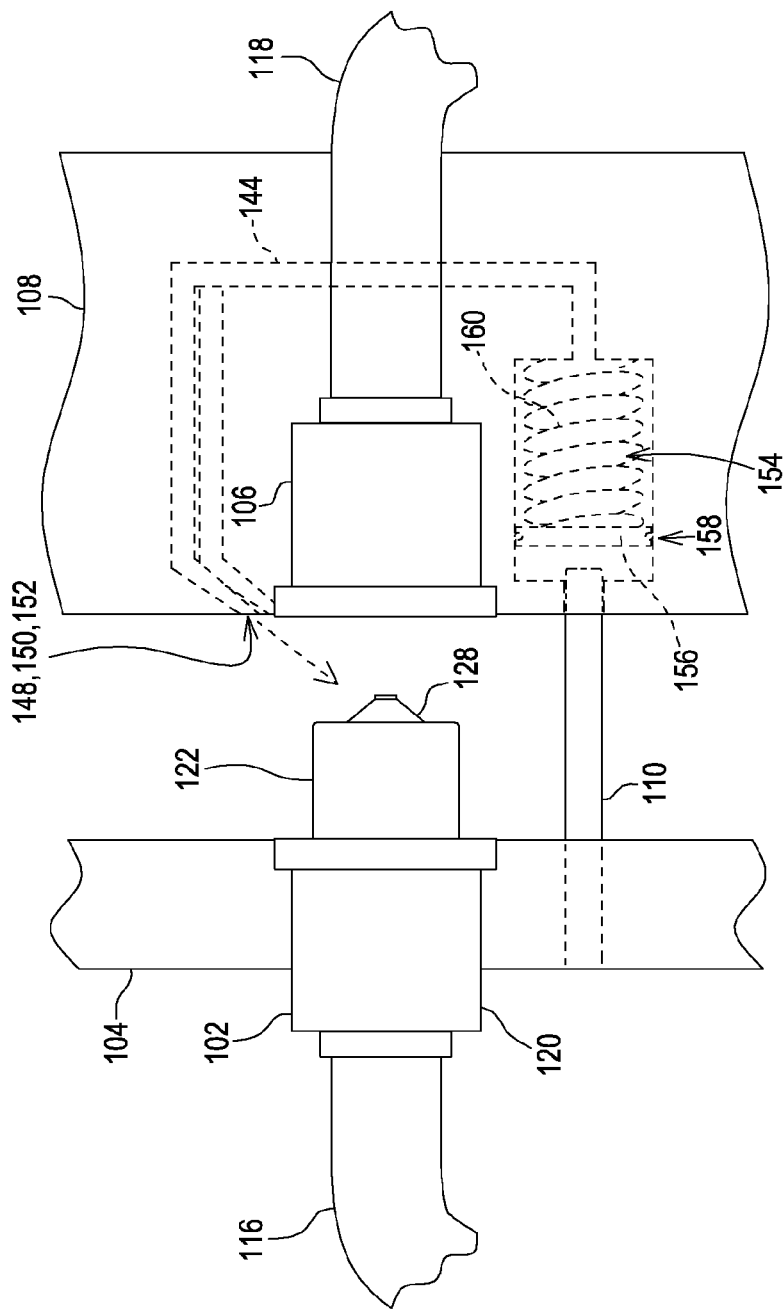

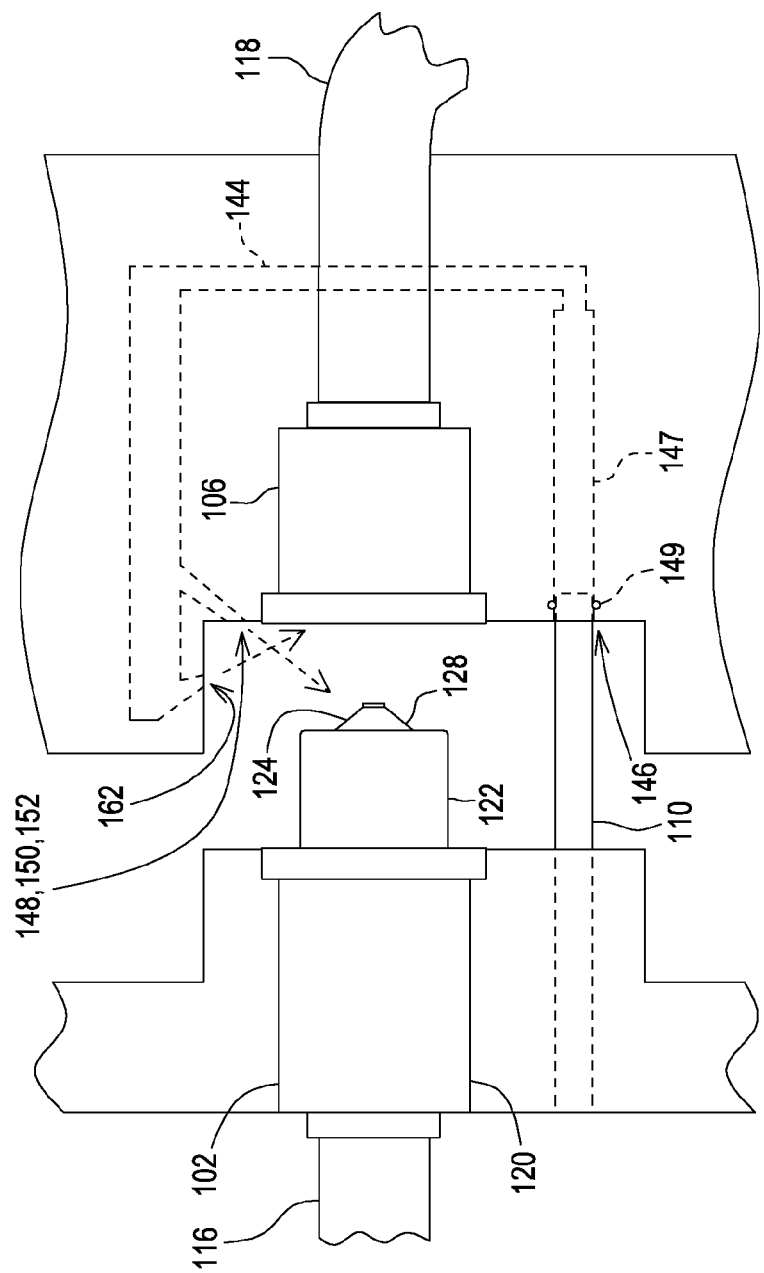

ARRANGEMENT FOR CLEANING HYDRAULIC COUPLER MATING SURFACES

FIELD

The field is hydraulic systems. More particularly, the field is the cleaning of coupling structures for hydraulic systems.

BACKGROUND

Couplers are used to couple hydraulic lines to each other. These couplers typically include check valves to prevent hydraulic fluid from leaking out or contaminants from entering into the hydraulic circuits. When the couplers are disconnected, these check valves seal the ends of the couplers thus preventing contaminants from entering into the hydraulic circuit, and hydraulic fluid from leaking out.

When the circuits are engaged, the sealing elements are pushed to the side and hydraulic fluid is permitted to flow from the hydraulic conduit connected to one coupler, through that coupler, into the second coupler, and into the hydraulic circuit on the other side.

The external surfaces of these hydraulic couplers are often contaminated with water, dirt, or other things that must be kept out of the hydraulic circuit. When the couplers are pushed into engagement, there is a risk that contaminants on the outer surfaces of the hydraulic couplers will enter into the hydraulic circuits and cause damage.

One way of preventing this problem is to manually wipe off all of the external surfaces of the couplers that will interengage with each other and across or through which hydraulic fluid will flow when the mating couplers are engaged. This requires a certain attention to detail. It also requires clean rags, solvents, or other agents to ensure that the mating couplers are cleaned before they are engaged.

Hydraulic couplers such as these are often used on agricultural implements and vehicles such as combine harvesters, harvesting heads, and the like. The environment in which these mating couplings are engaged and disengaged is quite often dirty: a barn, agricultural field, or on a dirt road where cleaning materials are not readily at hand.

What is needed, therefore, is an improved arrangement for cleaning the mating surfaces of hydraulic couplers before they are interengaged.

It is an object of this invention to provide an arrangement.

SUMMARY

In one arrangement, a first coupling and a second coupling are provided that are configured to engage with each other and to communicate hydraulic fluid from one to the other. The first mating coupler defines a fluid conduit that is filled with a cleaning fluid. During the coupler engagement process, the first and second mating couplers are moved toward each other. During this process, and before full engagement of the first mating coupler and the second mating coupler, the relative motion of structures on the first mating coupler in the second mating coupler as they are advanced towards each other cause the cleaning fluid in the fluid conduit to become compressed. This compression, in turn, causes the cleaning fluid to be ejected from a nozzle on the first mating coupler. This nozzle is disposed to direct the cleaning fluid ejected from the nozzle across a mating surface of the second mating coupler, and by it's impingement upon the mating surface of the second mating coupler, to remove at least a portion of the contaminants on the mating surface of the second mating coupler.

In another arrangement, a hydraulic coupler is provided having a first coupling mounted in a first support; a second coupling mounted in a second support, wherein the first support further comprises a cleaning actuator, wherein the second support further defines a fluid conduit, the fluid conduit defining an actuator opening configured to receive the cleaning actuator, the fluid conduit further defining an aperture that is disposed to direct fluid ejected from the fluid conduit against at least one of the first coupling or the second coupling or both the first coupling and the second coupling.

The cleaning actuator may be received in the fluid conduit when the first support and the second support are forced together to engage the first coupling and the second coupling.

The cleaning actuator may be disposed to displace fluid in the fluid conduit and force said fluid out of the aperture when said first support and said second support are brought together to hydraulically engage the first coupling and the second coupling.

At least one coupling of the first coupling and the second coupling may include a sealing valve disposed to seal the end of the at least one coupling when the first coupling and the second coupling are separated from each other.

Fluid ejected from the aperture may be directed by the aperture to flush contaminants off the surface of the sealing valve when the first support and the second support are brought together such that the first coupling and the second coupling engage each other to conduct hydraulic fluid through the first coupling and the second coupling.

Hydraulic fluid ejected from the fluid conduit may be sprayed in a jet of hydraulic fluid defining an impact point on the surface of the first coupling that moves across the surface of the first coupling as the first coupling moves toward the second coupling to hydraulically engage the second coupling.

The cleaning actuator may be configured to pass through the actuator opening and into a cavity located inside the second support when the first support and the second support are pushed together to engage the first coupling and the second coupling.

The hydraulic coupler may further comprise an internal piston disposed inside the cavity.

The cleaning actuator is disposed to engage the internal piston when the first support and the second support are brought together.

An inner surface of the internal piston may contact the fluid in the fluid conduit and the internal piston may be configured to displace the fluid in the fluid conduit when the cleaning actuator abuts the internal piston and the first support and the second support are brought together.

The hydraulic coupler may further comprise a resilient member that is disposed inside the cavity and abuts the internal piston to bias the internal piston in the fluid conduit in a position away from the aperture.

The hydraulic coupler may further comprise at least one clamp configured to extend between and to couple the first support to the second support.

The at least one clamp may be manually operable, and is configured to drive the cleaning actuator into the actuator opening.

The at least one clamp may be configured to apply force to the cleaning actuator sufficient to eject the fluid from the aperture.

The aperture may include at least a first aperture directed at the first coupling, and at least a second aperture and directed at the second coupling.

The fluid ejected from the fluid conduit may be selected from the group comprising air and hydraulic fluid.

One of the first coupling and the second coupling may be a male coupling, and the other of the first coupling and the second coupling may be a female coupling.

The male coupling may be configured to be received within the female coupling, and the male coupling and the female coupling may be configured to interact such that an action of hydraulically engaging of male coupling with the female coupling may be configured to open seals on both the male coupling and the female coupling and to clean at least one of the male coupling and the female coupling.

The male coupling and the female coupling may be automatically sealed when they are disengaged from each other to prevent hydraulic fluid from leaking out of the male coupling and the female coupling.

BRIEF DESCRIPTION OF THE FIGURES

FIG. 2A is a side view of an alternative hydraulic coupler.

FIG. 2B is a view of the exposed face of the right side coupling of FIG. 2A.

FIG. 3A is a side view of an alternative hydraulic coupler.

FIG. 3B is a view of the exposed face of the right side coupling of FIG. 3A.

DETAILED DESCRIPTION

In the disclosure and claims herein the words "a", "an", "one", "the", "at least one", and "at least a", refer to at least one but perhaps more than one of an item. Whenever a term is to be limited to a single quantity of anything the phrase "only one" is used.

Figure 1A:
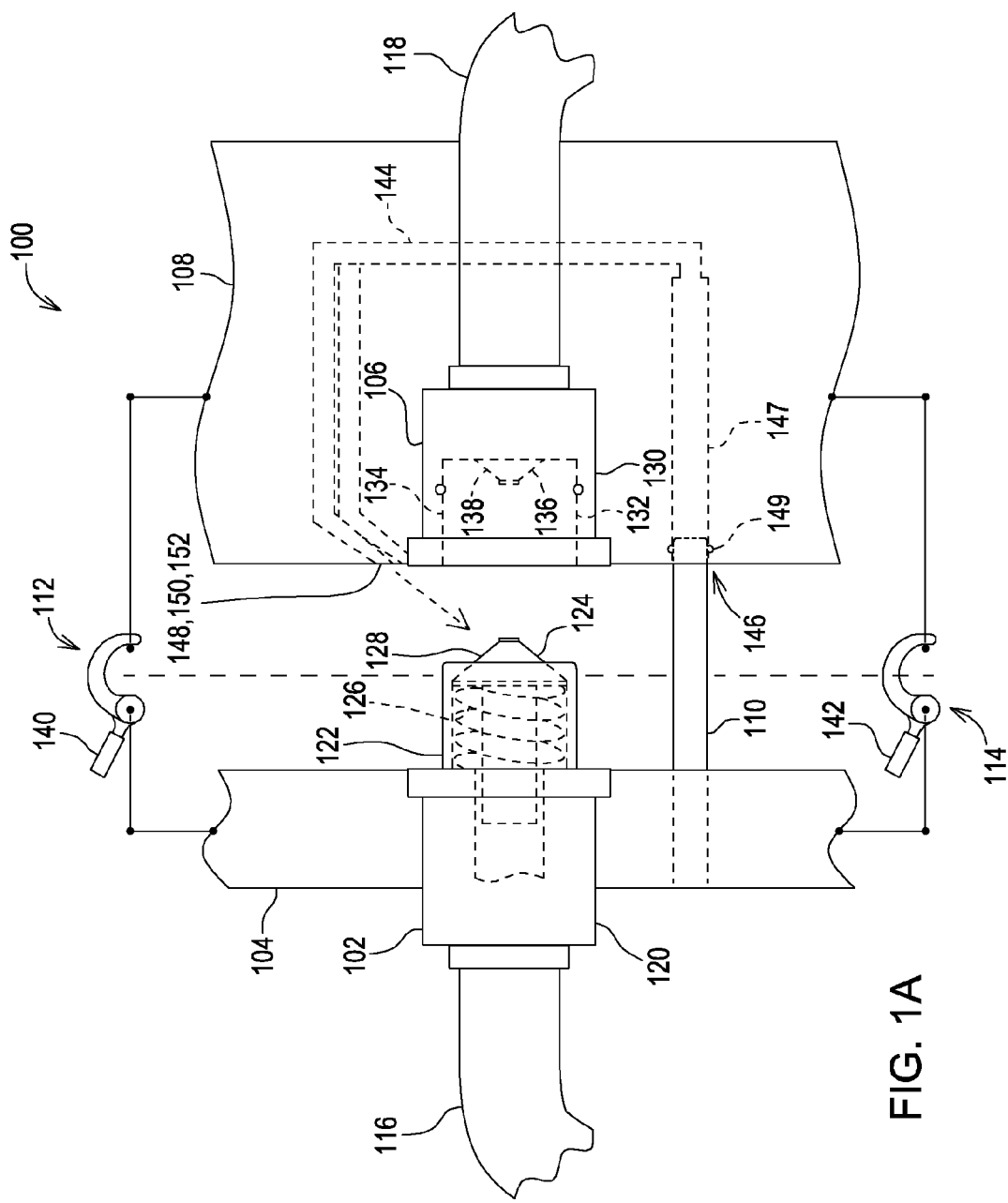
FIG. 1A is a side view of a hydraulic coupler in accordance with the present invention.
Figure 1B:
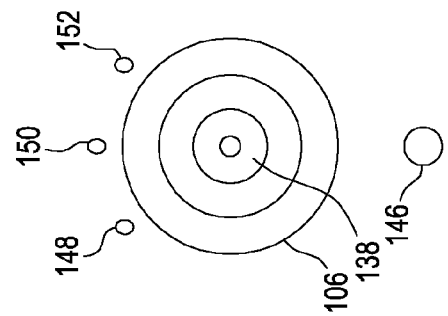
FIG. 1B is a view of the exposed face of the right side coupling of FIG. 1A.

Referring to FIGS. 1A and 1B, a hydraulic coupler 100 includes a first coupling 102 fixed to a first support 104, a second coupling 106 fixed to a second support 108, a cleaning actuator 110 fixed to the first support 104, a first clamp 112, and a second clamp 114. A first hydraulic conduit 116 is coupled to and extends from first coupling 102 to communicate hydraulic fluid to and/or from the first coupling. A second hydraulic conduit 118 is coupled to and extends from second coupling 106 to communicate hydraulic fluid to and/or from the second coupling.

First coupling 102 is a male hydraulic coupling comprising a general tubular structure 120 from which a male member 122 extends. Male member 122 is hollow, and is sealed at its outer end with a sealing valve 124. Sealing valve 124 seals against the outer end of male member 122. Sealing valve 124 is maintained in this sealed position by a spring 126 disposed inside the male member 122. Sealing valve 124 has an actuating surface 128 that forms an exposed outer surface of the sealing valve 124.

When the actuating surface 128 is depressed into the male member 122, a seal provided between the sealing valve 124 and the male member 122 by the abutment of the two surfaces is broken, permitting hydraulic fluid to flow from the first hydraulic conduit 116 into the male member 122 of the first coupling 102, then around the periphery of the sealing valve 124 and out of the first coupling 102.

The first coupling 102 is shown in its sealed position in all of the Figures herein. In this position, the sealing valve 124 is sealed against the male member 122 such that hydraulic fluid cannot leak out of the first coupling 102.

Second coupling 106 is a female hydraulic coupling comprising a generally tubular structure 130 that defines a generally cylindrical cavity 132. Cylindrical cavity 132 is configured to receive and engage the male member 122. A sealing ring 134 (here shown as an O-ring) is disposed inside the cylindrical cavity 132 and extends about its inner circumferential surface such that it seals the inner surface of cylindrical cavity 132 against the outside surface of the male member 122 to provide a highly leak resistant connection.

Tubular structure 130 is hollow, and is sealed with a second sealing valve 136. Second sealing valve 136 seals against the outer end of the tubular structure 130. The second sealing valve 136 is maintained in the sealed position by a spring (not shown) disposed inside the tubular structure 130 in the same manner as the spring 126 of the first coupling 102. Just as with the sealing valve 124, the second sealing valve 136 has an actuating surface 138 that forms an exposed outer surface of the second sealing valve 136.

When the actuating surface 138 is depressed into the tubular structure 130 (i.e. moved to the right in FIG. 1A), a hydraulic fluid seal provided by the abutting of the second sealing valve 136 and the tubular structure 130 is broken, thereby permitting hydraulic fluid to flow from the second hydraulic conduit 118 into the tubular structure 130 of the second coupling 106, then around the periphery of the second sealing valve 136 and out of the second coupling 106.

The first clamp 112 and second clamp 114 are coupled to the first support 104 and the second support 108 to draw the first support 104 and the second support 108 together. The first clamp 112 and the second clamp 114 are preferably configured the same. In the present case, they are manually operable clamps having a first handle 140 and a second handle 142, respectively, that can be manually actuated to draw the first support 104 and the second support 108 together. As the first support 104 and the second support 108 are drawn together in this manner, they force the male member 122 into the cylindrical cavity 132.

In an alternative embodiment, only one clamp is necessary to draw the first support 104 and the second support 108 together. In an alternative embodiment, two clamps are used to draw the first support 104 and the second support 108 together, but the two clamps are coupled together such that only one of the operator's hands is necessary to actuate both clamps. This connection between the first clamp 112 and the second clamp 114 is indicated by the dashed line shown in FIG. 1A.

Eventually, as the first clamp 112 and the second clamp 114 are actuated, they force the actuating surface 128 into contact with the actuating surface 138.

As the first clamp 112 and the second clamp 114 are further actuated, they push the sealing valve 124 and the second sealing valve 136 into the first coupling 102 and the second coupling 106, respectively, compressing their respective springs. This breaks the seal between the sealing valve 124 and the first coupling, and breaks the seal between the second sealing valve 136 and the second coupling 106.

The sealing ring 134 is disposed such that the two seals are broken only after the male member 122 has engaged the sealing ring 134. In this manner, as hydraulic fluid is released from both the first coupling 102 and the second coupling 106, it is contained within of the cylindrical cavity 132, and does not leak out upon the ground.

Dirt and other contaminants may be deposited on the outside surfaces of the ends of the first coupling 102 and the second coupling 106. In particular, it may be deposited on the sealing valve 124 and the second sealing valve 136, as well as deposited on the outer surfaces of the first coupling 102 and the second coupling 106 immediately adjacent to the sealing valve 124 and the second sealing valve 136.

When the first clamp 112 and the second clamp 114 are actuated, any dirt or other contaminants on exposed actuating surface 128 could be introduced into the cylindrical cavity 132. When the sealing valve 124 and the second sealing valve 136 break their seals and permit hydraulic fluid to flow, the flowing hydraulic fluid will flush the dirt off the ends of the first coupling 102 and the second coupling 106 and introduce it into the hydraulic fluid flow traveling through the hydraulic system and into the first hydraulic conduit 116 and the second hydraulic conduit 118.

To reduce the possibility of contamination, the second support 108 is provided with a fluid conduit 144. Fluid conduit 144 defines an internal passage extending inside the second support 108, and having at least two openings. The first of these openings is an actuator opening 146, which defines an open outer end of a cylindrical cavity 147 sized complementary to, and for receiving an external actuator, here shown as the cleaning actuator 110, which is defined by cylindrical rod. The cleaning actuator 110 is aligned with the actuator opening 146 to be received in the cavity 147 when the first clamp 112 and the second clamp 114 are actuated bringing the first support 104 and the second support 108 together. As the first clamp 112 and the second clamp 114 are actuated, the cleaning actuator 110 is pressed past an o-ring 149 provided in an outer end region of the cavity 147 and against fluid inside the cavity 147 and remaining portions of the fluid conduit 144. As a result, the fluid inside the fluid conduit 144 is forced through the fluid conduit 144 until it reaches a second one of the at least two openings, which in this embodiment comprises three apertures 148, 150, 152.

The fluid inside the actuator opening and the fluid conduit 144 is forced out of the fluid conduit 144 in three jets, each jet directed at an outer surface of the first coupling 102 adjacent to the sealing valve 124 and directed at an outer surface of the sealing valve 124. The apertures 148, 150, 152 direct the fluid ejected from the fluid conduit 144 in the direction indicated by the arrow extending from the apertures 148, 150, 152 shown in FIG. 1A (also FIGS. 2A, 3A which are discussed below).

These three jets of fluid spray against the first coupling 102 as the first coupling 102 and the second coupling 106 are drawn together by the first clamp 112 and the second clamp 114.

These three jets of fluid flush dirt and other contaminants off the outside surfaces of the ends of the first coupling 102 while the two couplings are apart, thus reducing or eliminating contaminants from the outer surface of the first coupling 102.

It is the relative movement of the first coupling 102 and the second coupling 106 that causes fluid to be ejected from apertures 148, 150, 152. The power for the three jets is provided by the operation of the first clamp 112 and the second clamp 114. It is the operator's movement of the first claim 112 and of the second clamp 114 that draw the first support 104 and the second support 108 together. And it is this relative drawing together movement that forces the cleaning actuator 110 into the cavity 147.

In some cases, the cleaning actuator 110 may itself be dirty. Furthermore, the volume of fluid displaced by the cleaning actuator 110 as it extends into the cavity 147 actuator opening 146 may be insufficient to clean the outer surfaces of the first coupling 102.

In either of these cases, a second arrangement of the device of FIG. 1, which is shown in FIG. 2, may be beneficial.

The arrangement of FIGS. 2A and 2B is identical in all respects to that of FIGS. 1A and 1B, except for the following differences: the cylindrical cavity 147 of FIG. 1A is replaced with a somewhat larger cylindrical cavity 154 in the arrangement of FIG. 2A.

A further difference is the provision of an internal piston 156 which is is supported inside the cavity 154. The internal piston 156 is maintained in a first position 158 by a resilient member 160, another addition to the arrangement of FIG. 1. The resilient member 160 is shown in FIG. 2 as a coil spring, and is disposed inside the cavity 154. The internal piston 156 encloses the end of the fluid conduit 144, and provides a barrier between the fluid in the fluid conduit 144 and any contaminants that may be on the end of the cleaning actuator 110 that would otherwise be injected into the fluid conduit 144 and mix with the fluid inside the fluid conduit 144.

The first clamp 112 and the second clamp 114 have been removed from the embodiment of FIGS. 2A-2B for convenience of illustration. Their operation with the embodiment of FIGS. 2A and 2B is the same as described above with regard to the embodiment of FIGS. 1A-1B.

Another arrangement is shown in FIG. 3A and FIG. 3B. This arrangement is identical in all respects to that of FIGS. 1A-1B, except that it includes an additional aperture 162 that is directed toward the second coupling 106. The additional aperture 162 directs the fluid ejected from the fluid conduit 144 in the direction indicated by the arrow extending from the additional aperture 162. The fluid ejected from the additional aperture 162 is directed toward the second coupling 106 to clean the second coupling 106. In addition, the additional aperture 162 will also serve to cleanse the outer surface of male member 122 just before it is inserted into the cylindrical cavity 132.

Thus, apertures can be provided for the fluid conduit 144 that are disposed to direct fluid to impact and cleanse both the first coupling 102 and the second coupling 106 disposed on the first support 104 and the second support 108, respectively.

The first clamp 112 and the second clamp 114 have been removed from the embodiment of FIGS. 3A-3B for convenience of illustration. Their operation with the embodiment of FIGS. 3A and 3B is the same as described above with regard to the embodiment of FIGS. 1A-1B.

The arrangement of FIGS. 3A-3B may also be provided with the same cavity 154, internal piston 156 and resilient member 160 as illustrated in and described above in conjunction with FIGS. 2A-2B.

In the arrangement disclosed herein, first support 104 is shown supporting a single first coupling 102. Likewise, second support 108 is shown supporting a single second coupling 106. First support 104 and second support 108 are generally planar structures. In the figures herein, they are shown in fragmentary form with the edges of the supports cut off (as indicated by the standard wavy lines in each of FIGS. 1A, 2A, and 3A).

In practice, additional advantages to this invention would be provided in a multiplex device in which several mating first couplings 102 are disposed side-by-side in first support 104 and second couplings 106 are disposed in a mating side-by-side arrangement in second support 108. Thus, the single couplings illustrated herein can be multiplied and placed side-by-side in parallel mating relationships, each with an associated fluid conduit 144, perhaps a single conduit 144 serving all of the couplings, or multiple fluid conduit 144 arrangements each serving a single first coupling 102 and second coupling 106. In one common arrangement, between four and twelve of these first couplings 102, and second couplings 106 could be provided in side-by-side two-dimensional array in a single first support 104 and second support 108, respectively. Two, four, or even more cleaning actuators 110 could be provided each aligned with their own associated actuator opening 146 and cavity 147 or 154 of corresponding conduit 144.

We claim:

1. A hydraulic coupler (100) comprising:
a first coupling (102) mounted in a first support (104);
a second coupling (106) mounted in a second support (108);
wherein the first support further comprises a cleaning actuator (110);
wherein the second support (108) further defines a fluid conduit (144), the fluid conduit (144) having an open end defining an actuator opening (146) configured to receive the cleaning actuator (110), the fluid conduit (144) further defining an aperture (148, 150, 152, 162) that is disposed to direct fluid ejected from the fluid conduit (144) against at least one of the first coupling (102) or the second coupling (106) or both the first coupling (102) and the second coupling (106).

2. The hydraulic coupler (100) of claim 1, wherein the cleaning actuator (110) is received in the fluid conduit (144) when the first support (104) and the second support (108) are forced together to engage the first coupling (102) and the second coupling (106).

3. The hydraulic coupler (100) of claim 1, wherein the cleaning actuator (110) is disposed to displace fluid in the fluid conduit (144) and force said fluid out of the aperture (148, 150, 152, 162) when said first support (104) and said second support (108) are brought together to hydraulically engage the first coupling (102) and the second coupling (106).

4. The hydraulic coupler (100) of claim 1, wherein at least one coupling of the first coupling (102) and the second coupling (106) includes a sealing valve (124, 136) disposed to seal an end of the at least one coupling when the first coupling (102) and the second coupling (106) are separated from each other.

5. The hydraulic coupler (100) of claim 4, wherein the aperture (148, 150, 152, 162) is so located and disposed relative to a surface of the sealing valve (124, 136) that fluid ejected from the aperture (148, 150, 152, 162) is directed by the aperture (148, 150, 152, 162) to flush contaminants off a surface of the sealing valve (124, 136) prior to the sealing valve (124, 136) opening, when the first support (104) and the second support (108) are brought together to the extent that the first coupling (102) and the second coupling (106) engage each other to conduct hydraulic fluid through the first coupling (102) and the second coupling (106).

6. The hydraulic coupler (100) of claim 1, wherein the first coupling (102) includes a male member (122) having an exposed surface and wherein fluid ejected from the fluid conduit (144) is sprayed in a jet of hydraulic fluid that travels across the exposed surface of the first coupling (102) as the first coupling (102) moves toward the second coupling (106) to hydraulically engage the second coupling (106).

7. The hydraulic coupler (100) of claim 1, wherein the cleaning actuator (110) is configured to pass through the actuator opening (146) and into a cavity (147, 154) located inside the second support (108) when the first support (104) and the second support (108) are pushed together to couple the first coupling (102) with the second coupling (106).

8. The hydraulic coupler (100) of claim 7, wherein said cleaning actuator (110) is defined by a cylindrical rod which may optionally serve as a piston, and wherein said cavity (147, 154) is cylindrical, and further comprising an internal piston (110, 156) disposed inside the cavity (147, 154).

9. The hydraulic coupler (100) of claim 8, wherein the cleaning actuator (110) is disposed to engage the internal piston (156) when the first support (104) and the second support (108) are brought together.

10. The hydraulic coupler (100) of claim 9, wherein an inner surface of the internal piston (156) is adapted to contact fluid in the fluid conduit (144) and further wherein the internal piston (156) is configured for displacing fluid in the fluid conduit (144) when the cleaning actuator (110) abuts the internal piston (156) and the first support (104) and the second support (108) are brought together so as to move the piston (156) toward the aperture (148, 150, 152, 162).

11. The hydraulic coupler (100) of claim 8, further comprising a resilient member (160) that is disposed inside the cavity (154) and abuts the internal piston (156) to bias the internal piston (156) in the fluid conduit (144) in a position away from the aperture (148, 150, 152, 162).

12. The hydraulic coupler (100) of claim 1, further comprising at least one clamp (112, 114) configured to extend between and to couple the first support (104) to the second support (108).

13. The hydraulic coupler (100) of claim 12, wherein the at least one clamp (112, 114) is manually operable, and is configured to drive the cleaning actuator (110) into the actuator opening (146).

14. The hydraulic coupler (100) of claim 13, wherein the at least one clamp (112, 114) is configured to apply force to the cleaning actuator (110) sufficient to eject the fluid from the aperture (140, 150, 152, 162).

15. The hydraulic coupler (100) of claim 1, wherein the aperture (148, 150, 152, 162) includes at least a first aperture (148, 150, 152) directed at the first coupling (102), and at least a second aperture (162) and directed at the second coupling (106).

16. The hydraulic coupler (100) of claim 1, wherein the fluid adapted to be ejected from the fluid conduit (144) is selected from the group comprising air and hydraulic fluid.

17. The hydraulic coupler (100) of claim 1, wherein one of the first coupling (102) and the second coupling (106) is a male coupling, and the other of the first coupling (102) and the second coupling (106) is a female coupling.

18. The hydraulic coupler (100) of claim 17, wherein the male coupling (102) is equipped with a normally closed seal (128) for preventing leakage from the male coupling (102) and is configured to be received within the female coupling (106), which is also equipped with a normally closed seal 138 for preventing leakage from the female coupling (106); and wherein the male coupling (102) and the female coupling (106) are configured to interact such that an action of moving the couplings together so that the male coupling (102) is received within the female coupling (106) results in the seals (128) and (138) being opened and in at least one of the male coupling (102) and the female coupling (106) being cleaned.

19. The hydraulic coupler (100) of claim 18, wherein the seals (128) and (138), respectively of the male coupling (102) and the female coupling (106) are automatically closed when the couplings (102) and 106 are disengaged from each other to prevent hydraulic fluid from leaking out of the male coupling and the female coupling.

* * * * *